2,906,709
LUBRICANT ADDITIVE OF HIGH METAL CONTENT

Norman E. Lemmon, Hammond, and Fred W. Schuessler, Valparaiso, Ind., assignors to Standard Oil Company, Chicago, Ill., a corporation of Indiana No Drawing. Application May 31, 1956
Serial No. 588,237

7 Claims. (Cl. 252—32.7)

This invention relates to a neutralized lube oil additive containing a reaction product of a phosphorus sulfide and a butylene polymer and having a high barium content, and it pertains more particularly to an improved product of this type and an improved method of making the product.

It is known that phosphorus sulfide-hydrocarbon reaction products having a high barium content are desirable additives for premium heavy duty lubricating oils. Many methods have been proposed to produce such a product. One of the more recent general methods for introducing large quantities of barium into various acidic materials, such as the reaction product of phosphorus sulfide and a hydrocarbon, uses a basic barium compound in the presence of a phenol. In this method, a very large excess of barium is needed to obtain a given barium content in the final product, and in accordance with this reaction a complex between the barium, acid and the phenol are formed which is not always completely soluble in oil. This is particularly true if phenol is employed and the acid constituent is the reaction product of a phosphorus sulfide and a butylene polymer. The presence of this complex, and the excess barium, makes the product very viscous and thus difficult to filter and also quite cloudy after filtration. It has also been found that in accordance with this general method, when using phenol rather than alkylated phenols, the complex which is formed hydrolyzes in use and loses some of its effectiveness.

An object of this invention is to provide a method of preparing a high barium content, phosphorus sulfide-butylene polymer reaction product which is not subject to hydrolysis in use. Another object is to provide an improved method of preparing a detergent additive for lubricating oil which is bright, has a low viscosity and is easy to filter and has a high barium to phosphorus ratio. A more specific object is to provide a method of introducing relatively large quantities of barium into a phosphorus sulfide-butylene polymer reaction product in the presence of phenol. Other objects will be apparent as the detailed description of the invention proceeds.

In accordance with our invention, a phosphorus sulfide-butylene polymer reaction product, preferably obtained by reacting a butylene polymer having a molecular weight of from about 150 to 50,000 with from about 1% to about 50% of phosphorus pentasulfide at a temperature of from about 200° F. to about 600° F., which reaction product together with any unreacted polymer has been hydrolyzed at a temperature of from about 220° to about 500° F., generally in the presence of a suitable diluent such as a hydrocarbon oil, and then extracted at a temperature of from about 100° to about 212° F. with from about 10% to about 200% by volume of a mixture consisting of water and from about 5% to about 95% by volume of phenol or an alkyl alcohol having from 1 to 5 carbon atoms, is neutralized by preparing a reaction mixture of the extracted reaction product plus unreacted polymer and diluent oil, barium hydroxide, phenol and water and gradually heating from about 160° F. to about 400° F. while introducing $CO_2$ in excess of the amount which can be absorbed by the mixture. It is preferable to maintain the temperature below the boiling point of water, i.e., about 212° F. for at least about one-half hour. When this step is completed, the reaction mixture is steamed to remove substantially all phenol. It can then be filtered. The barium hydroxide in the reaction mixture is present in the range of from about 1 to about 10 times the amount necessary to just neutralize the extracted reaction product. The phenol is present in sufficient amount to maintain the reaction mixture acidic and the water content is in the range of from about 2% to about 10% based on the total weight of the reaction mixture.

Upon cooling to room temperature, the resultant product is bright, has a low viscosity and is readily soluble in lubricating oil, and because of its high barium content it has outstanding utility as a lubricating oil additive for improving detergency and other desirable properties when added to lubricating oils in amounts of about .001% to about 10%. The ratio of barium to phosphorus is about 2 to 4 times that of the normal barium salt, it is highly stable, not being subject to hydrolysis, and is very bright and substantially free from phenol.

In the extraction step employed just prior to the neutralization step, either phenol or an alcohol having from 1 to 5 carbon atoms is used as pointed out hereinbefore. Examples of suitable alcohols are methanol, ethanol, isopropanol, isoamyl alcohol and the like. The contacting time is not critical and can be varied over a wide range; usually a contacting time of from about one-fourth of an hour to about 20 hours, and preferably from about one-half hour to about six hours is sufficient to obtain the desired result. Following this extraction step, the phenol or alcohol-water mixture is allowed to separate and is withdrawn. When an alcohol is employed in this step, it must be completely removed before the neutralization step. This may be accomplished by blowing with an inert gas or by steam distillation followed by a period of heating to remove any water introduced by the steam. It is preferable, therefore, to use phenol inasmuch as it does not have to be removed before the neutralization step. We have found that following the phenol extraction step, the raffinate contains about 10% by weight of free phenol. Since it generally takes at least this much phenol to maintain an acidic reaction mixture, it does not have to be removed, thus eliminating one step in the process.

Finally divided solid $Ba(OH)_2 \cdot 8H_2O$ is a preferred form of barium hydroxide since it enables control of added water, it should be understood that other barium compounds may be employed and the amount of added water controlled by accurate measurement. The water referred to herein means added water and does not include water of neutralization between the barium hydroxide and phenol.

In the preparation of the phosphorus sulfide-butylene polymer reaction product, the butylene polymer is reacted with a phosphorus sufide, such as $P_2S_3$, $P_4S_3$, $P_3S_7$, or other phosphorus sulfides, and preferably phosphorus pentasulfide. The butylene polymer employed in this reaction is preferably the product obtained by polymerizing, in the liquid phase, a hydrocarbon mixture containing butylenes and isobutylenes together with butanes and some $C_3$ and $C_5$ hydrocarbons at a temperature between about 0° F. and 30° F., in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity, such as, for example, from about 80 seconds to about 2000 seconds Saybolt Universal at 210° F. Other methods may be used to prepare the butylene polymer. For instance, it could be prepared in the presence of a catalyst such as sulfuric acid, boron fluoride or other similar halide catalysts of the Friedel-Crafts type.

The phosphorus sulfide-butylene polymer reaction product is prepared by reacting a butylene polymer of the desired molecular weight with from about 1% to about 50%, and preferably from about 5% to about 25%, of a phosphorus sulfide, e.g., $P_2S_5$, at a temperature of from about 200° F. to about 600° F. in a non-oxidizing atmosphere, such as, for example, an atmosphere of nitrogen. The reaction is carried out for from about one to about ten hours or more, and preferably for about five hours. The phosphorus sulfide-hydrocarbon reaction can, if desired, be carried out in the presence of a sulfurizing agent such as sulfur, sulfur chloride, etc. The reaction product obtained is then hydrolyzed at a temperature of from about 200° F. to about 500° F., and preferably at a temperautre of 300° F. to 400° F., by a suitable means, such as, for example, by introducing steam through the reaction mass.

The hydrolyzed product containing inorganic phosphorus acids formed in the hydrolysis step is then contacted with a mixture consisting of water and a hydroxy compound such as phenol or an alcohol having from one to about five carbon atoms. This extraction step is carried out at a temperature of from about 100° F. to about 212° F., and preferably from about 120° F. to about 180° F. At temperatures lower than this, the time to complete the extraction step is uneconomical and at temperatures higher than above indicated the water and/or hydroxy compound vaporizes too rapidly thus resulting in high pressures or large and expensive condensers. It is preferable to employ from about 20% to about 100% by volume of the water-hydroxy compound mixture, although from about 10% to about 200% or more by volume may be employed. The water-hydroxy compound mixture may contain from about 5 to about 95% by volume of the hydroxy compound, and preferably from about 20% to about 60% by volume. It is essential, of course, that the hydroxy compound have a water solubility of at least about 5% by volume at the reaction temperature.

It is preferable, before contacting the reaction product with the water-hydroxy compound mixture, to dilute the phosphorus sulfide-butylene polymer reaction product with a normally liquid hydrocarbon, generally the same as, or similar to, the hydrocarbon oil in which the finished additive is to be employed, to a phosphorus content of from about 0.5% to about 5% and preferably from about 1.5% to about 2.5%.

The diluted, extracted reaction product thus obtained will have an acidity of from about 15 to about 30 or more milligrams of KOH per gram of product. The amount of barium hydroxide required to completely neutralize the acidic reaction product is calculated and from one to about ten times this amount is employed in the neutralization step; it is preferable to use from about 2 to about 5 times the amount necessary to just neutralize the acidic reaction product. The amount of phenol employed in the neutralization step is then determined based on the amount of basic barium compound used; at least enough phenol is employed to maintain the mixture acidic. If the reaction mixture is allowed to become basic, hydrogen sulfide, which is continuously formed during the neutralization reaction, will react with the barium present to form barium sulfide and thus the product will be cloudy and the efficiency of barium utilization will be decreased. It is preferable to employ phenol in about 100% excess of that required to just maintain the reaction mixture acidic. The water content of the reaction mixture is in the range of from about 2% to about 10% based on the total weight of reaction mixture. We have found that water in excess of the defined range causes the system to become cloudy due to the formation of barium sulfide. If the amount of water in the system is less than the defined range, the barium phenolate phosphonate complex is incompletely split—even at high temperatures, and the final product will tend to hydrolyze in use. The amount of water in the system is varied within the defined range as the amount of phenol is varied within its defined range; thus, if the amount of phenol employed is toward the upper limit of the defined range, the amount of water should preferably be employed toward the upper limit of its defined range.

When the reaction mixture of extracted phosphorus sulfide-butylene polymer reaction product plus unreacted polymer, barium hydroxide, phenol and water, in a diluent, has been prepared as described, the mixture is gradually heated to about 400° F. Beginning at about 160° F. carbon dioxide is introduced in excess of amounts which can be absorbed by the system. The gradual heating should be for a duration of about 1 to 3 hours and it is preferable to maintain the temperature between about 160° F. and about 212° F. for a period of at least one-half hour so that substantial quantities of $CO_2$ are introduced into the mixture before any substantial amount of water has been eliminated. After the maximum temperature has been reached and the introduction of $CO_2$ has been terminated, the product is allowed to cool to about 350° F. and steamed at this temperature with superheated steam for about one hour to effect removal of any phenol left in the system. The product is then filtered and is ready for use.

The following examples are illustrative of the herein described invention and are not intended as being indicative of the scope thereof:

EXAMPLE 1

A butylene polymer having a molecular weight of about 700 was reacted with 15% $P_2S_5$ at a temperature of about 400° F. and the reaction product was hydrolyzed with steam at a temperature of about 400° F. until the acidity of the product remained substantially constant with continued steaming. The hydrolyzed product was then diluted with an equal volume of SAE–5 base oil, resulting in an acidity of 38 mg. KOH per gram of diluted product and a total phopshorus content of 2.04% by weight. 200 grams of the diluted product was then extracted with 200% by volume of 50% aqueous phenol at 180° F. for about one hour. The mixture was allowed to cool and settle at room temperature. The resultant system separated into three phases: the bottom phase containing mostly low molecular weight phosphorus acids, the middle phase containing phosphoric acid and the top raffinate phase containing oil soluble organic phosphorus acids, oil and about 10% by weight of phenol. The acidity of the raffinate phase—exclusive of the acidity due to the phenol—was 22.4 mg. KOH per gram of raffinate.

EXAMPLE 2

A butylene polymer having a molecular weight of about 700 was reacted with a mixture of 16% $P_2S_5$ and 2% sulfur at a temperature of 400° F. for a period of 10 hours. The reaction product was then hydrolyzed with steam at a temperature of 370° F. to 400° F. for a period of five hours until a constant acidity of 70 milligrams of NaOH per gram of product was obtained. The hydrolyzed product was diluted with an equal volume of an SAE 10 base oil and then heated and stirred at 200° F. for about one hour with 170 vol. percent of aqueous phenol (90 vol. percent water plus 10 vol. percent phenol). The mixture was allowed to settle at 175° F. and two phases formed. The bottom aqueous phenol solution was removed and stripped of water and phenol. The stripped bottoms fraction was approximately 70% phosphoric acid with the remainder being low molecular weight organic phosphorus acids. The top raffinate phase which represented 97% of the charge had an acidity of 25.7 milligrams NaOH per gram of raffinate.

EXAMPLE 3

The oil-diluted hydrolyzed reaction product of $P_2S_5$ and butylene polymer of Example 1 was contacted with 50% of aqueous ethyl alcohol (95% ethanol plus 5% water) at 100 to 130° F. for about 2 hours. The aqueous ethanol was then removed along with about 10% by weight of the oil-diluted $P_2S_5$-butylene polymer reaction product. The acidity of the extracted $P_2S_5$-butylene polymer reaction product was reduced about 50%.

EXAMPLE 4

The oil-diluted hydrolyzed reaction product of $P_2S_5$ and butylene polymer of Example 1 was contacted with 40% of aqueous isoamyl alcohol (50% water plus 50% alcohol) at 180° F. to 200° F. for about one hour. The aqueous alcohol extract was then removed and the raffinate had an acidity of 27 mg. KOH per gram and a total phosphorus content of 1.80%.

EXAMPLE 5

The total raffinate of Example 1 which weighed 216 grams and of which 100 grams was diluent oil, 22 grams was phenol and 94 grams was phosphorus pentasulfide-butylene polymer reaction product plus unreacted polymer was admixed with 40.6 grams of $Ba(OH)_2 \cdot 8H_2O$ plus 35 grams of phenol. Expressed percentagewise and based on the total weight, the mixture had the following composition:

| Reactant | Weight gms. | Percent by weight |
|---|---|---|
| Diluent oil | 100 | 34.3 |
| $P_2S_5$-polymer + unreacted polymer | 94 | 32.2 |
| Phenol | 57 | 19.5 |
| $Ba(OH)_2 \cdot 8H_2O$: | | |
| $Ba(OH)_2$ | 22 | 7.5 |
| $H_2O$ | 18.6 | 6.5 |

This mixture of raffinate, phenol, barium hydroxide and water was stirred and heated to 160° F. At this temperature, $CO_2$ was added and the temperature was raised to about 200° F. and held for one-half hour. The temperature was then raised to 340° F. in one hour followed by raising to 400° F. and maintaining 400° F. for one-half hour. Carbon dioxide introduction was discontinued, the system cooled to 340° F., and steamed with superheated steam for 15 minutes. After steaming it was cooled to 300° F. and filtered. This filtration step was accomplished with great ease. The final product was very bright and contained 8.05% barium, 1.32% phosphorus, 0.98% sulfur and less than 0.02% phenol. The barium to phosphorus ratio was thus 6.2 to 1.

The amount of barium employed in the foregoing example represents three times the amount required to just neutralize the organic phosphorus acids present and the amount of phenol present was more than enough to maintain the reaction mixture acidic (16.9 grams of phenol would be required to maintain a neutral solution in the foregoing example). As pointed out hereinbefore, it is essential that both water and $CO_2$ be present, at least initially, to completely split the barium-phenolate-phosphonate complex. Should this complex not be split completely, the product will be heavy and contain substantial amounts of phenol. To illustrate this, Example 5 was repeated, but only a small amount of water was used in the reaction mixture as follows:

EXAMPLE 6

*Composition of reaction mixture containing insufficient water*

| Component | Weight, gms. | Percent by weight |
|---|---|---|
| Diluent oil | 100 | 36 |
| $P_2S_5$-polymer + unreacted polymer | 94 | 33.9 |
| Phenol | 57 | 20.6 |
| $Ba(OH)_2$ | 24 | 8.6 |
| $H_2O$ | 2.5 | 0.9 |

The product resulting from this reaction mixture was very viscous and contained appreciably more than 0.1% phenol.

In runs made wherein excess water was used, the system became cloudy due to the formation of barium sulfide. This illustrated by the following reaction mixture:

EXAMPLE 7

*Composition of reaction mixture containing excess water*

| Component | Weight, gms. | Percent by weight |
|---|---|---|
| Diluent oil | 100 | 32.2 |
| $P_2S_5$-polymer + unreacted polymer | 94 | 30.3 |
| Phenol | 57 | 18.4 |
| $Ba(OH)_2$ | 22 | 7.1 |
| $H_2O$ | 37.2 | 12.0 |

This system, upon the introduction of $CO_2$, turned almost milky white and remained in this condition.

The required water may be introduced in the form of combined water with barium hydroxide, or it may be introduced as free water and dehydrated barium hydroxide may be used. When the reaction is carried out in the absence of phenol, the resultant product has a low barium to phosphorus ratio (3:1 or less) leaving any excess barium hydroxide unreacted and subsequently removed by the filtration step.

While the foregoing examples demonstrate our improved process employing a phenol extracted phosphorus sulfide-butylene polymer reaction product, we have observed in the laboratory that the process is equally applicable to phosphorus sulfide-butylene polymer reaction products which have been extracted with a water alcohol mixture in which the alcohol has from 1 to about 5 carbon atoms.

The barium containing, neutralized reaction product of a phosphorus sulfide and a butylene polymer obtained in accordance with our invention is useful as an additive and lubricant composition used for the lubrication of internal combustion engines.

Percentages given herein and in the appended claims are weight percentages unless otherwise noted.

While we have described our invention by reference to specific embodiments thereof, the same are given by way of illustration only. Modifications and variations will be apparent from our description to those skilled in the art.

We claim:

1. In the preparation of a barium containing, oil soluble lubricant additive wherein a butylene polymer is reacted with from about 1% to about 50% of a phosphorus sulfide at a temperature of from about 200° F. to about 600° F. and the resultant reaction product hydrolyzed at a temperature of from about 220° F. to about 500° F., and then extracted at a temperature of from about 100° F. to about 212° F. with from about 10% to about 200% by volume of a mixture consisting of water and from about 5% to about 95% by volume of a hydroxy compound selected from the group consisting of phenol and alkyl alcohols having from one to five carbon atoms, and the extracted reaction product neutralized with a basic barium compound, the improvement comprising neutralizing said extracted reaction product by preparing a reaction mixture of said extracted reaction product, barium hydroxide, phenol and water in a hydrocarbon oil diluent, the barium hydroxide being present in the range of from about 1 to about 10 times the amount necessary to neutralize said extracted reaction product, the phenol being present in sufficient amount to maintain the reaction mixture acidic and the water content being in the range of from about 2% to about 10% based on the total weight of reaction mixture, gradually heating the mixture to about 400° F. while introducing $CO_2$ thereto in excess of amounts which can be absorbed and steaming the mixture and then filtering the product to obtain a bright high barium containing additive having a low viscosity.

2. The method of treating a hydrolyzed reaction product of a phosphorus sulfide and a butylene polymer whereby a composition of high barium content is obtained which method comprises extracting said hydrolyzed reaction product at a temperature of from about 100° F. to about 212° F. with from about 10% to about 200% by volume of a mixture consisting of water and from 5% to 95% by volume of a hydroxy compound selected from the group consisting of phenol and alkyl alcohols having from one to five carbon atoms, separating said hydroxy compound solution from said hydrolyzed reaction product, heating the extracted product at a temperature above about 212° F. to remove dissolved water and hydroxy compound, preparing a reaction mixture of said extracted reaction product, barium hydroxide, phenol and water in a hydrocarbon oil diluent, the barium hydroxide being present in the range of from about 1 to about 10 times the amount necessary to neutralize said extracted reaction product, the phenol being present in sufficient amount to maintain the reaction mixture acidic and the water content being in the range of from about 2% to about 10% based on the total weight of reaction mixture, gradually heating the mixture to about 400° F. while introducing $CO_2$ thereto in excess of amounts which can be absorbed and steaming the mixture and then filtering the product to obtain a bright high barium containing additive having a low viscosity.

3. The method of claim 2 wherein the gradual heating is for a duration of about one to three hours.

4. The method of treating a hydrolyzed reaction product of a phosphorus sulfide and a butylene polymer whereby a composition of high barium content is obtained, which method comprises extracting said hydrolyzed reaction product at a temperature of from about 100° F. to about 212° F. with from about 10% to about 200% by volume of a mixture consisting of water and from 5% to 95% by volume of phenol, removing the phenol-water extract phase, preparing a reaction mixture of the extracted reaction product, barium hydroxide, phenol and water in a hydrocarbon oil diluent, the barium hydroxide being present in the range of from about 1 to about 10 times the amount necessary to just neutralize said extracted reaction product, the phenol being present in sufficient amount to maintain the reaction mixture acidic and the water content being in the range of from about 2% to about 10% based on the total weight of reaction mixture, gradually heating the mixture to about 400° F. while introducing $CO_2$ thereto in excess of amounts which can be absorbed and steaming the mixture and then filtering the product to obtain a bright high barium containing additive having a low viscosity.

5. The method of claim 4 wherein the gradual heating is for a duration of about one to three hours.

6. The method of claim 4 wherein the gradual heating is for a duration of at least one hour and the temperature is maintained below about 212° F. for the first one-half hour.

7. The method of treating a hydrolyzed reaction product of a phosphorus sulfide and a butylene polymer whereby a composition of high barium content is obtained, which method comprises extracting said hydrolyzed reaction product at a temperature of from about 100° F. to about 212° F. with from about 10% to about 200% by volume of a mixture consisting of water and from 5% to 95% by volume of phenol, removing the phenol-water extract phase, preparing a reaction mixture of the extracted reaction product, barium hydroxide, phenol and water in a hydrocarbon oil diluent, the barium hydroxide being present in the range of from about 1 to about 10 times the amount necessary to just neutralize said extracted reaction product, the phenol being present in sufficient amount to maintain the reaction mixture acidic and the water content being in the range of from about 2% to about 10% based on the total weight of reactants, introducing $CO_2$ into the mixture in excess of amounts which can be absorbed while heating the mixture for at least about one-half hour at a temperature in the range of from about 160° F. to about 212° F. and for at least about one-half hour in the range of from about 212° F. to about 400° F., steaming the mixture and then filtering the product to obtain a bright composition of high barium content having a low viscosity.

References Cited in the file of this patent

UNITED STATES PATENTS

| | | |
|---|---|---|
| 2,463,429 | Roberts | Mar. 1, 1949 |
| 2,534,217 | Bartleson | Dec. 19, 1950 |
| 2,647,889 | Watson et al. | Aug. 4, 1953 |
| 2,677,620 | Lemmon et al. | May 4, 1954 |
| 2,695,910 | Asseff et al. | Nov. 30, 1954 |
| 2,723,234 | Asseff et al. | Nov. 8, 1955 |
| 2,767,164 | Asseff et al. | Oct. 16, 1956 |
| 2,806,022 | Sabol | Sept. 10, 1957 |